United States Patent
Moulton

(10) Patent No.: US 9,964,834 B2
(45) Date of Patent: May 8, 2018

(54) THERMAL WAVEGUIDE

(71) Applicant: Physical Sciences, Inc., Andover, MA (US)

(72) Inventor: Peter F. Moulton, Bedford, MA (US)

(73) Assignee: Physical Sciences, Inc., Andover, MA (US)

( * ) Notice: Subject to any disclaimer, the term of this patent is extended or adjusted under 35 U.S.C. 154(b) by 0 days. days.

(21) Appl. No.: 14/843,300

(22) Filed: Sep. 2, 2015

(65) Prior Publication Data

US 2016/0062210 A1 Mar. 3, 2016

Related U.S. Application Data

(60) Provisional application No. 62/044,504, filed on Sep. 2, 2014.

(51) Int. Cl.
| | |
|---|---|
| *G02F 1/365* | (2006.01) |
| *G02B 6/122* | (2006.01) |
| *G02F 1/35* | (2006.01) |
| G02F 1/355 | (2006.01) |
| G02B 6/12 | (2006.01) |
| G02F 1/39 | (2006.01) |

(52) U.S. Cl.
CPC ............. *G02F 1/365* (2013.01); *G02B 6/122* (2013.01); *G02F 1/3525* (2013.01); G02B 2006/12135 (2013.01); G02F 1/3556 (2013.01); G02F 1/395 (2013.01)

(58) Field of Classification Search
CPC .......................... G02B 27/283; H04J 14/0201
See application file for complete search history.

(56) References Cited

U.S. PATENT DOCUMENTS

| | | | |
|---|---|---|---|
| 5,463,705 A * | 10/1995 | Clauberg | G02B 6/125 385/14 |
| 6,904,219 B1 * | 6/2005 | Fermann | C03B 19/1469 385/126 |
| 2002/0018636 A1 * | 2/2002 | Bischel | G02B 27/283 385/140 |

* cited by examiner

*Primary Examiner* — Sung Pak
*Assistant Examiner* — Hoang Tran
(74) *Attorney, Agent, or Firm* — Iandiorio Teska & Coleman, LLP

(57) ABSTRACT

In a high power optical system, a thermal waveguide including an optical material having an index of refraction sensitive to changes in temperature, the rectangular optical material having a first dimension and a second dimension in a horizontal plane and a third dimension in a vertical plane, the third dimension being approximately ten times smaller than the first and second dimension, at least one heat sink thermally coupled to the optical material to establish a one-dimensional thermal gradient across the third dimension of the optical material, the thermal gradient having a parabolic profile across the rectangular optical material, and wherein the optical material is configured to act as a waveguide when a laser beam having a power of greater than one watt is incident upon the optical material.

21 Claims, 5 Drawing Sheets

| PARAMETER | VALUE | COMMENTS |
|---|---|---|
| PUMP RADII | 5000 μm (x); 150 μm (y) | AT CENTER OF CRYSTAL |
| PUMP DIVERGENCE | 0.127 mrad | DIFFRACTION LIMITED IN OpGaAs |
| HEAT SINK TEMPERATURE | 293.15°K | 20°C |
| THERMAL CONDUCTIVITY | 0.054 W/(mm K) | |
| CTE | $5.97 \times 10^{-6}$ (1/K) | |
| ELASTIC MODULUS | 116,000 N/mm² | |
| POISON'S RATIO | 0.31 | |
| REFLEX INDEX | 3.358 | |
| dn/dT | $2.04 \times 10^{-4}$ (1/K) | |
| HEAT EFFICIENCY FACTOR | 1.0 | RATIO OF PUMP LIGHT CONVERTED TO HEAT |

FIG. 3

$$\eta^2(x) = \begin{cases} \eta_{max}^2 \left[ 1 - 2\Delta \dfrac{x^2}{(D/2)^2} \right] & |x| \leq D/2 \\ \eta_1^2 - \dfrac{QD\eta_1}{k} \dfrac{d\eta}{dT} |x| + \dfrac{Q^2 D^2 x^2}{4k^2} \left( \dfrac{d\eta}{dT} \right)^2 & |x| > D/2 \end{cases}$$

(1)

where k is the thermal conductivity, Q is the heat input per unit volume, n is the refractive-index, $\eta_1 = \eta(\pm D/2) = \eta_{max} \sqrt{1 - 2\Delta}$, and $\Delta = QD^2/(8k\eta_{max}) d\eta/dT$.

FIG. 4A $$F_m = \frac{1}{4} k_0 \left( \frac{Q\eta_{max}}{k} \frac{d\eta}{dT} \right)^{1/2} D^2 - (2m + 2\Delta v_m + 1) \geq 0$$

FIG. 4B

| # | Crystal | dn/dT (x $10^{-6}$) (1/K) | Thermal conductivity (W/m-K) | Lensing strength (m/W) | Thermal shock resistance (W/m) | Product of thermal shock resistance and lensing strength |
|---|---|---|---|---|---|---|
| 1 | KD*P | 25 | 1.9 | 13.2 | 145 | 1908 |
| 2 | $LiNbO_3$ | 47 | 5.6 | 8.4 | 40 | 336 |
| 3 | $\beta\text{-}Ba_2BO_4$ (BBO) | 16.6 | 1.4 | 11.9 | 39 | 462 |
| 4 | $LiB_3O_5$ (LBO) | 13 | 3.5 | 3.7 | NA | |
| 5 | $KTiOPO_4$ (KTP) | 19 | 2.5 | 7.6 | NA | |
| 6 | $AgGaSe_2$ | 74 | 1.1 | 67.3 | 39 | 2623 |
| 7 | $ZnGeP_2$ (ZGP) | 147 | 36 | 4.1 | NA | |
| 8 | GaAs | 200 | 53 | 3.8 | 4100 | 15471 |
| 9 | GaN | 115 | 130 | 0.88 | 8600 | 7608 |
| 10 | GaP | 100 | 97 | 1.0 | 13000 | 13402 |
| 11 | ZnSe | 60 | 19 | 3.2 | 1900 | 6000 |
| 12 | $Al_2O_3$ | 13.7 | 28 | 0.49 | 3400 | 1663 |
| 13 | $Y_3Al_5O_{12}$ (YAG) | 7.3 | 13 | 0.56 | 1450 | 814 |

Properties of crystals

FIG. 5

THERMAL WAVEGUIDE

CROSS-REFERENCE TO RELATED APPLICATIONS

This application claims priority to and the benefit of, and incorporates by reference herein in its entirety, U.S. Provisional Patent Application No. 62/044,504, filed Sep. 2, 2014.

BACKGROUND OF THE INVENTION

Heat generated in optically transparent materials resulting from laser action or nonlinear processes can create unwanted distortion of the light beams passing through the materials. Typically the generated heat is removed by contacting the material to a heat-removal agent, either another solid material, or a flowing liquid or gas. The resultant flow of heat leads to a temperature gradient in the material. Since the refractive index of a material is temperature dependent, the gradient in temperature leads to a gradient in the refractive index of the material.

The gradient in refractive index can lead to distortion of the beam passing through the material. The distortion typically consists of a modification of the phase across the beam, leading to a change in the beam properties. In some cases, especially if the material is inside an optical resonator, the distortion may be so significant that the resonator no longer functions, i.e. becomes "unstable." Alternatively, the properties of the resonator may become so highly dependent on the amount of heat in the material that any device based on the resonator becomes impractical to use. For materials used as amplifiers, the beam distortion can lead to significant changes in the amplified output beam properties.

The present invention relates to an impending need to design optical systems that can function in the presence of thermally induced gradients in the index of refraction, in particular thermally induced gradients in nonlinear crystals.

SUMMARY OF THE INVENTION

The problem of designing nonlinear optical systems capable of functioning in the presence of optical beam distortion due to large thermally induced gradients in the refractive index of the nonlinear crystal is solved by treating the nonlinear crystal as an optical waveguide. In the presence of a substantial heat load, the amount depending on the thermo-optic properties of the specific crystal, thermal gradients induced by absorption of light in a nonlinear crystal having a change in refractive index with temperature can lead to substantial changes in the optical properties of the crystal. As an example, the crystal can act as a lens with a focal length of a fraction of a meter. As a result, the beam size and divergence of light beams passing through the crystal can change in an undesirable manner. Under certain conditions, discussed in more detail below, the impact of the change in the crystal optical properties can be reduced through an optical design that considers the crystal as a waveguide for light. The waveguide properties are relatively insensitive to changes in the heat load. For example, the mode size of a model waveguide according to the present invention is reduced by only 30% for a factor of two increase in the heat load.

In general, the change in the optical properties of a solid material subjected to a heat load can be approximated under certain assumptions. For example, we consider material in the form of a long, thin, cylindrical rod, with length at least ten times that of the diameter and where heat is generated uniformly in the material and is removed through the cylindrical surface of the rod. The rod cross section exhibits, to a good approximation, a parabolic distribution of temperature around the peak temperature at the center axis of the rod. Ignoring the effects of stress and the subsequent change in index from the stress-optic effect and also the deformation of the ends of the rod, the resultant optical distortion can be modeled as a simple spherical lens (a "thermal lens"), providing that the focal length of the resultant lens is much greater than the length of the rod.

The formula for the inverse of the thermal lens focal length, f, the dioptric power, D, is given by:

$$D=1/f=(P_d dn/dT)/(2\kappa A), \qquad (1)$$

Where $P_d$ is the total heat power dissipated in the rod, $dn/dT$ is the change in refractive index (n) in the material with temperature (T), often referred to as the thermo-optic coefficient, $\kappa$ is the thermal conductivity of the material and A is the cross-sectional area of the rod. A large dioptric power leads to a greater distortion of the optical properties of a beam passing through the material.

Another example of a geometry that is subject to relatively simple modeling is a thin (where the thickness is at least 1/10 of the other slab dimensions) rectangular slab, with heat flow out only through the large faces of the slab. The flow in this case is primarily along the direction normal to the face of the slab and the cross-sectional temperature gradient is that of a one-dimensional parabolic nature, falling off from the maximum temperature. The latter occurs in a plane centered between the two large faces of the slab. The refractive index gradient, like the heat flow, is along the axis perpendicular to the large faces. For this system the optical effects for a beam passing through the length of the material are well approximated by a cylindrical lens, as long as the lens focal length is long compared to the length of slab. The formula for the focal length of the lens is similar to that for the rod, with a different constant multiplier. It is important to note that a large number of materials, including all those discussed in the following, have a positive value for the thermo-optic coefficient, and thus lead to a positive (i.e. focusing) thermal-lens effects. An empirical relation, by Moss (T. S. Moss, *Optical Properties of Semiconductors* (Butterworths, London, 1961)), that has proven effective at estimating the thermo-optic coefficient, is given by the following formula:

$$dn/dT=(n/4E_g)dE_g/dT, \qquad (2)$$

where $E_g$ is the band-gap energy of the material and $dE_g/dT$ is the change in band-gap energy with temperature. The formula is valid for light wavelengths far away from the wavelength corresponding to the band gap energy. A number of nonlinear optical crystals are or can be based on semiconductor materials that have a high transparency (absorption losses less than 5%) into the infrared wavelength region. In general, these materials also have a relatively small band gap energy compared to many other nonlinear materials, and thus tend to show a large value (>50×10$^{-6}$ per degree C.) for their thermo-optic coefficient.

Another important characteristic of optical materials is their ability to withstand large thermal gradients, which create stress in the material resulting from the uneven level of thermal expansion across the gradient. High enough levels of stress can cause the material to fracture. A measure of the ability of a material to withstand thermal gradients is $R_T$, the thermal shock parameter (in W/m), given by $$R_T=k\sigma_T(1-\nu)/(\alpha E), \qquad (3)$$

where k is the thermal conductivity, $\sigma_T$ is the maximal tension the material can resist, a is the thermal expansion coefficient, E is Young's modulus and ν is the Poisson ratio. Higher thermal shock parameters lead to the ability of the material to sustain a higher level of thermal load. For both the rod and thin-slab material configuration the maximum heating power before fracture is simply proportional to the length of the material times the thermal shock parameter.

The largest dioptric power possible in a given material, $D_{max}$, is limited by thermal fracture. For the case of a thin rod, the result is that:

$$D_{max} = R_T[dn/dT/(2\kappa)](L/A) \quad (4)$$

where L is the length of the rod. A similar relation holds for the cylindrical lens power in the thin-slab geometry.

FIG. 5 presents data for an assortment of crystals used in nonlinear optical systems, with two crystals used as the hosts for solid state lasers added for comparison. The data for each crystal includes the thermo-optic coefficient, the thermal conductivity, and the ratio of the former to the latter (the lensing strength), a relative measure of the dioptric strength of the thermal lens in the material for a given amount of heat/area dissipated in the material. Also included in FIG. 5 are the thermal shock parameter, and the product of this parameter and the lensing strength, which provides the relative level of the fracture-limited maximum dioptric power for the same value for L/A of the material. Many of the numbers shown, especially the thermal shock parameters are approximate, as there are a limited number of references for many of the key properties of the materials, and thus no check on the reliability of the numbers used, but we believe them to be representative of the general properties of each crystal. Crystals 1-7 are non-isotropic, and a detailed tabulation shows that the parameters depend on the crystal orientation. To simplify FIG. 5 we use a single representative value for the crystal.

Crystals 1-5 are oxide-based insulators and are widely used in many nonlinear applications, especially for the generation of light in the near-infrared to UV wavelength regions. Compared to nearly all of the other materials in FIG. 5, they have small values of shock resistance. Semiconductor materials (6-11) that have been or can be used for nonlinear applications, with one exception, have much higher values of thermal shock resistance, comparable to or exceeding two well-known laser crystals—sapphire and YAG (12-13). (The one exceptional semiconductor nonlinear crystal, $AgGaSe_2$, is widely known to be a poor choice for high-power applications, as it has a small thermal shock parameter.)

In terms of all the nonlinear materials, the data in FIG. 5 shows that there is a notable difference between the insulator and semiconductor nonlinear crystals in the stress-fracture-limited dioptric power, as indicated by the numbers in the last column of FIG. 5. The implication of this is that the semiconductors in general, will exhibit a much greater level of thermo-optic distortion before they fracture, compared to the oxide materials.

Heat generation and resultant thermal distortion can occur in devices based on nonlinear crystals, such as harmonic generators, sum-frequency generators, difference-frequency generators, optical parametric generators, optical parametric amplifiers and Raman generators. In the case of Raman generators, the Raman process itself generates heat, through the generation of vibrational energy in the material and its conversion to heat, while in all other aforementioned optical components, heating occurs through absorption of the incident or internally generated power in the material and conversion of the absorbed power into heat.

In general, nonlinear materials, compared to laser materials, operate with optical beams that are much smaller in area than those encountered in laser systems. Typically, heat generation in laser materials occurs over diameters of several mm, while nonlinear crystals may, under certain conditions, operate with input beam sizes $\frac{1}{10}$ or less of that, leading to areas that are 1% or less of those in laser materials. As is evident from Equation 1, even if only a small fraction of the incident or generated power is converted into heat, leading to a relatively small value for $P_d$ compared to laser materials, the small area of the beam can lead to a large dioptric power in nonlinear crystals.

As the amount of heat generated in the material increases, the simple method of modeling the thermal effects as a lens, either spherical in the case of a rod, or cylindrical in the case of a thin, face-cooled slab, no longer suffices. In particular, the simple lens approximation fails when the focal length predicted by the approximation becomes comparable to or less than the length of the material. In that case it is well known that the more appropriate model for the optical properties of the material is that of an optical waveguide. From FIG. 5, it is evident that these extreme conditions are much more likely to take place in semiconductor nonlinear materials.

In traditional optical waveguides in solid materials, waveguiding takes place in a region where the refractive index is designed, through spatial structuring of the material, to be higher in the waveguide region than that of surrounding material. For a thin, face cooled slab, where a nonlinear optical material exhibits an increase in refractive index with temperature, heat generation in the material can create a condition similar to a planar waveguide, where radiation is confined only in the thin dimension of the slab. In cases of materials that exhibit a large value of fracture-limited dioptric power, the wave-guiding effect is strong enough such that the spatial extent of the waveguide mode is contained well within the thin dimension of the material. To design an optical system to be used in this case, the invention here teaches that the design should match the external beam of interest incident on the material to the planar waveguide mode created by the thermal gradient, where a typical waveguide height is a fraction of a millimeter. With this design approach, one can operate stable resonators or amplifiers where the output beam properties are reasonably insensitive against changes in the heating level. In addition, the beam properties in the thin dimension remain constant inside the crystal, by virtue of the properties of waveguides, avoiding focusing effects that could lead to optical damage or other undesirable effects.

The semiconductor materials 8-11 listed in FIG. 5, are from the III-V and II-VI class of materials, most of which have a cubic structure and thus, do not have birefringence that can permit conventional phase-matching for processes such as harmonic generation or optical parametric amplification. A solution to overcome this, orientation-patterning, was developed initially for the material GaAs (L. A. Eyres, P. J. Tourreau, T. J. Pinguet, C. B. Erbert, J. S. Harris, M. M. Fejer, L. Becouram, B. Gerard, E. Lallier, "All-epitaxial fabrication of thick, orientation-patterned GaAs films for nonlinear frequency conversion," Appl. Phys. Lett. 79, 904-906 (2001)) and is under development for other semiconductors from the III-V and II-VI classes. The present invention is particularly of interest for orientation-patterned semiconductor crystals, but is not necessarily limited to them, and may be of use with other nonlinear materials, such as $ZnGeP_2$.

The models we show in the Detailed Description below apply to orientation-patterned GaAs (OP-GaAs) as it is commercially available and under wide consideration for application in high-average-power nonlinear conversion. Those skilled in the art will recognize that a similar technological approach can be applied to other nonlinear materials.

In one aspect, the invention features a thermal waveguide in a high power system. The system includes an optical material having an index of refraction sensitive to changes in temperature, the rectangular optical material having a first dimension and a second dimension in a horizontal plane and a third dimension in a vertical plane, the third dimension being approximately ten times smaller than the first and second dimension. The system also includes at least one heat sink thermally coupled to the optical material to establish a one-dimensional thermal gradient across the third dimension of the optical material, the thermal gradient having a parabolic profile across the rectangular optical material. The optical material is configured to act as a waveguide when a laser beam having a power of greater than one watt is incident upon the optical material.

In some embodiments, the optical material has a planar geometry. In some embodiments, the optical material is a semiconductor material or a nonlinear optical material. In some embodiments, the index of refraction of the optical material changes by a factor of approximately $1 \times 10^{-4}$ for every degree Kelvin change in temperature. In some embodiments, the optical material has a stress fracture limit that permits waveguiding of the high power laser. In some embodiments, the optical material is configured to act as a thermal lens along the third dimension when a laser beam having a power of greater than one watt is incident upon the optical material. In some embodiments, the optical material has a thermal shock resistance and a lensing strength, the product of the shock resistance and the lensing strength being greater than approximately 2000. In some embodiments, the optical material is at least one of $ZnGeP_2$, $CdGeAs_2$, $CdSiP_2$, GaP, GaN, AlIGaAs, ZnSe, ZnTe and CdTe.

In another aspect, the invention features a thermal waveguide in a high power system. The system includes an optical material having an index of refraction sensitive to changes in temperature. The system also includes cooling means thermally coupled to the optical material to establish a one dimensional thermal gradient across a smallest dimension of the optical material. The optical material is configured to act as a waveguide when a laser beam having a power of greater than one watt is incident upon the optical material.

In some embodiments, the optical material has a planar geometry. In some embodiments, the optical material is a semiconductor material or a nonlinear optical material. In some embodiments, the index of refraction of the optical material changes by a factor of $1 \times 10^{-4}$ for every degree Kelvin change in temperature. In some embodiments, the optical material has a stress fracture limit that permits waveguiding of the high power laser. In some embodiments, the optical material is configured to act as a thermal lens across the smallest dimension of the optical material when a laser beam having a power of greater than one watt is incident upon the optical material. In some embodiments, the optical material has a thermal shock resistance and a lensing strength, the product of the shock resistance and the lensing strength being greater than approximately 2000. In some embodiments, the optical material is at least one of $ZnGeP_2$, $CdGeAs_2$, $CdSiP_2$, GaP, GaN, AlIGaAs, ZnSe, ZnTe and CdTe.

In yet another aspect, the invention features a method for guiding an optical beam in a high power system. The method involves providing an optical material having an index of refraction sensitive to changes in temperature, the optical material having a thermal shock resistance and a lensing strength, the product of the shock resistance and the lensing strength being greater than approximately 2000. The method also involves providing a cooling means thermally coupled to the optical material to establish a one dimensional thermal gradient across a smallest dimension of the optical material. The method also involves delivering a first laser beam having a power of greater than one watt to an entrance facet of the optical material, the laser beam transforming the optical material into a waveguide. The method also involves delivering a second laser beam to the entrance facet of the optical material, wherein the second laser beam is guided to an exit facet by the waveguide.

In some embodiments, the optical material is a semiconductor material or a nonlinear optical material. In some embodiments, the index of refraction of the optical material changes by a factor of approximately $1 \times 10^{-4}$ for every degree Kelvin change in temperature. In some embodiments, the optical material is at least one of $ZnGeP_2$, $CdGeAs_2$, $CdSiP_2$, GaP, GaN, AlIGaAs, ZnSe, ZnTe and CdTe.

As used herein, the terms "approximately," "roughly," and "substantially" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed invention.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a table showing parameters describing an illustrative embodiment of the invention.

FIGS. 4A and 4B show equations used to describe the behavior of the index of refraction of an optical material.

FIG. 5 shows a table of crystals and their associated physical properties.

DETAILED DESCRIPTION

Figure 1:
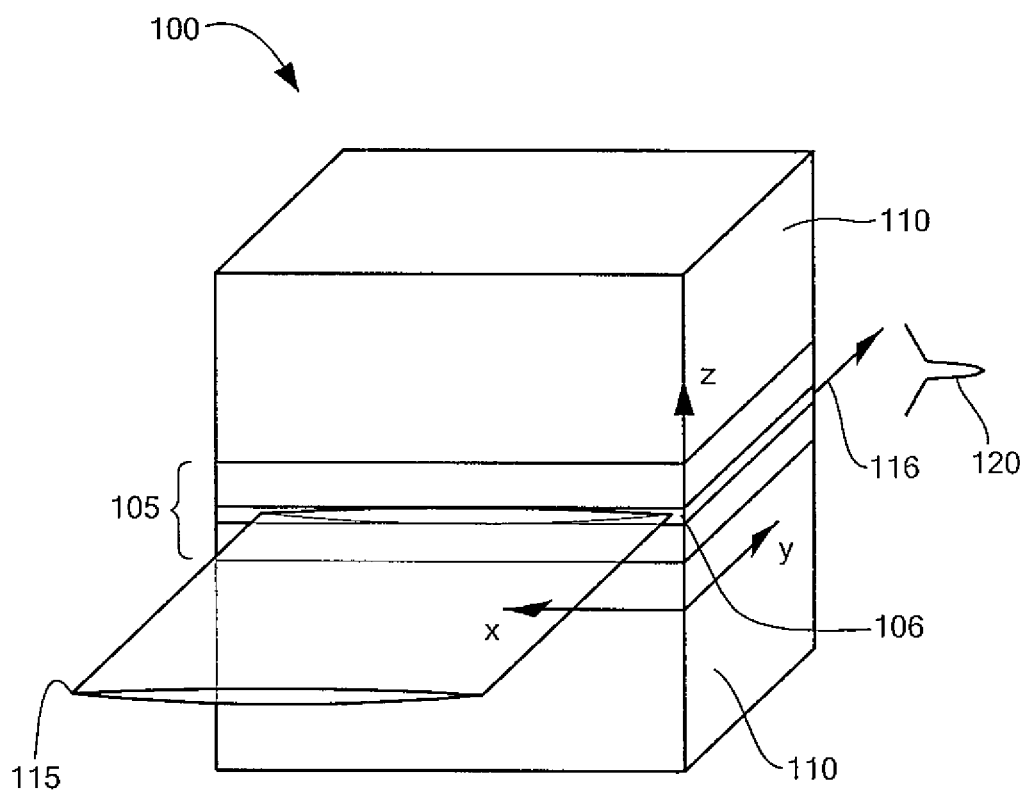
FIG. 1 is a diagram of a thermal waveguide system according to an illustrative embodiment of the invention.

FIG. 1 depicts a thermal waveguide 100 in accordance with an illustrative embodiment of the present invention.

The thermal waveguide 100 includes a nonlinear optical or semiconductor material 105 having an entrance facet 106, one or more heat sinks 110, an elliptical pump beam 115 travelling along the y-axis, and an exit beam 116 travelling along the y-axis. The heat sinks 110 are thermally coupled to the nonlinear optical material 105. During operation, the elliptical pump beam 115 is incident upon the entrance facet 106, heating the nonlinear optical material 105. The generated heat flows out of the nonlinear optical material and into the heat sinks 110, generating a one-dimensional spatial temperature variation in the nonlinear optical material (i.e. a thermal gradient) along the z-axis as illustrated by the temperature/index profile 120. The thermal gradient can lead to a one-dimensional spatial variation in the index of refraction along the z-axis, which is also illustrated by the temperature/index profile 120. The temperature/index profile 120 shows that both the temperature and index of refraction can have parabolic profiles in the region of the semiconductor material 105 and non-parabolic profiles in the region of the heat sinks 110. The spatial variation in the index of refraction can lead to a thermal lensing effect. The thermal lensing can have an associated focal length that is short compared to a dimension of the thermal waveguide 100. The nonlinear optical material 105 can act as a waveguide, confining light along the z-axis when the focal length associated with the thermal lensing effect is short compared to a dimension of the thermal waveguide 100.

In some embodiments the nonlinear optical material can convert a portion of the elliptical pump beam 115 into a signal beam and an idler beam. In some embodiments, the exit beam 116 can include a portion of the elliptical pump beam 115, a signal beam, and an idler beam.

Figure 2:
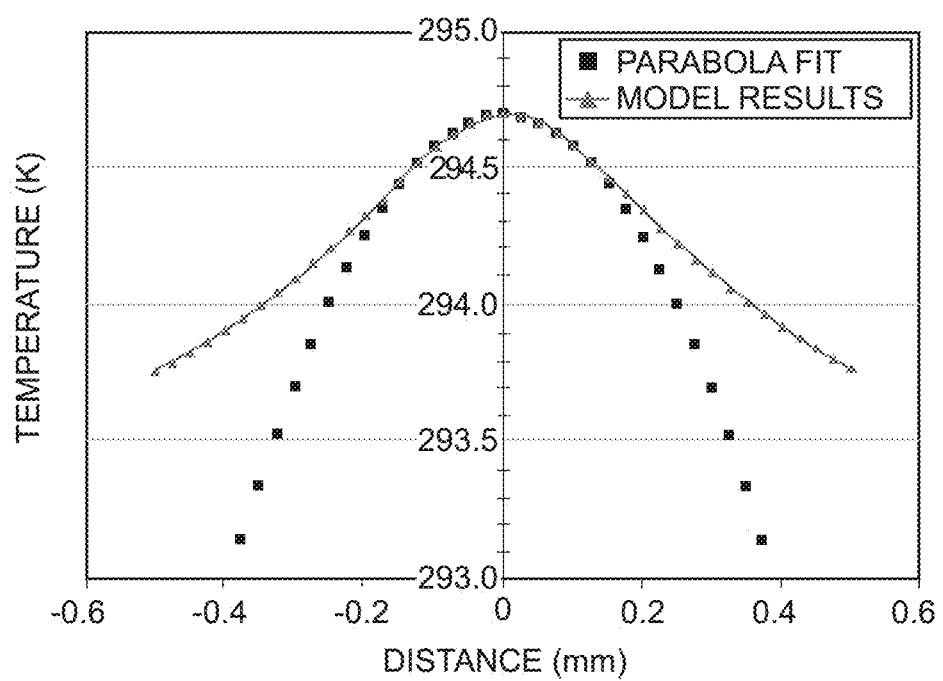
FIG. 2 is a graph showing the temperature gradient in the thermal waveguide system of FIG. 1, according to an illustrative embodiment of the invention.

As an exemplary calculation for the thermal, mechanical and optical properties of the structure shown in FIG. 1, we show in FIG. 2 the predicted thermal profile along the z axis indicated in FIG. 1. The abscissa in FIG. 2 shows distance along the z-axis as measured from the center of the nonlinear optical material 105. The ordinate shows the temperature, measured in degrees Kelvin. At a distance of 0 mm (at the center of the crystal), the temperature is about 294.7 K. At a distance of ±0.2 mm away from the center of the crystal, the temperature is about 294.25 K. A summary of the parameters used in the calculations appear in FIG. 3, and are appropriate for the nonlinear material orientation-patterned GaAs (OP-GaAs). For the results plotted in FIG. 2, we assumed a total optical power in the material of 2 kW, and an absorption coefficient for that power of 0.01 $cm^{-1}$.

While the temperature difference across the crystal shown in FIG. 2 is only a few degrees, the thermal lens in the small dimension of the crystal (z-axis) can be significant due to the large value of dσ/dT in GaAs, as indicated in FIG. 3. A temperature difference as shown in FIG. 2 can lead to a thermal lensing effect that can be described by a cylindrical lens with a focal length of about 6.7 mm, close to the length of the crystal and thus clearly outside of the range for a simple lens approximation. The thermal gradient in the x-axis direction as shown in FIG. 1 can be much weaker than the thermal gradient in the z-axis direction, leading to a much weaker lens in the x-axis direction, on the order of meters of focal length. Such a condition suggests we treat the crystal as a planar optical waveguide, with the index gradient produced by the thermal profile in the crystal along the thin dimension.

Based on our calculation, the stresses produced in the model nonlinear optical material OP-GaAs, following the mechanical properties indicated in FIG. 5, we find that the stress in the material is a small fraction of the calculated fracture limit. Our calculations show that, even for absorptions as high as 0.1 $cm^{-1}$, the OP-GaAs would be only at about 1% of its stress-fracture limit.

In some embodiments, the nonlinear optical material can be $ZnGeP_2$, $CdGeAs_2$, or $CdSiPz$. In some embodiments, the nonlinear optical material 105 can include the III-V materials GaP and GaN as well as ternary III-V compounds such as AlIGaAs, and the II-VI materials ZnSe, ZnTe and CdTe.

FIG. 4A shows an equation describing a parabolic variation in the index of refraction, as a function of position within an optical medium. The treatment of thermally induced planar waveguides has been presented in the context of laser crystals, as an analogy to more conventional step-index planar waveguides formed by sandwiches of different-index materials. In the case of thermal waveguides, the best approximation is to consider the effect as creating a parabolic-index guide.

We assume that the absorbed power is uniformly deposited in a region of "height" D. The index of refraction, n, can be expressed as a function of the position (x), thermal conductivity (k), heat input per unit volume (Q), and, the change in refractive index per unit change in temperature (dn/dT).

FIG. 4B shows an equation describing a relationship between a numerical parameter, $F_m$, and the mode number, m (0 and higher), for the waveguide mode. The formula includes a small number, $\Delta v_m$, used to correct for deviations from a true parabolic shape to the refractive index distribution. To support a given mode number, m, the value of $F_m$ must be positive.

Our model calculations assume an optical power in the crystal of 2.1 kW, and absorption coefficient of 0.01 cm-1, a pumped region of 0.03 (D)×1×3 cm and the nonlinear optical material thermo-mechanical-optical parameters listed in FIG. 5. The result of such calculations can indicate a volumetric thermal load (Q) of about 700 $W/cm^3$ and a value of $F_m$ of approximately 2.3 for the lowest order (fundamental) mode (m=0) and 0.33 for the next higher-order mode (m=1), assuming that the mode wavelength is 4000 nm. We estimate that vertical mode radius for the lowest order mode is about 43 µm. The results of the calculations can show the nonlinear optical material acting as waveguide, guiding two modes. Any optical design involving the model nonlinear crystal would endeavor to match this fundamental mode, and the result would be a beam that propagated inside the nonlinear crystal with a constant vertical size, and outside of the crystal would be expected to have properties that were relatively insensitive to the actual power absorbed in the nonlinear material. Our calculations show a small change in mode size from our nominal 2.1 kW of optical power, ranging from 46.6 µm at 1.5 kW of power to 41.1 µm at 2.5 kW of power.

Those skilled in the art will understand that the model calculations can be applied to a wide variety of planar geometries similar in general shape to that in the FIG. 1, but differing in details regarding dimensions, optical powers involved, absorption coefficients and particular nonlinear materials. The waveguide design will be effective for nonlinear optical materials 105 having a relatively large value, (exceeding approximately 2000) of the product of thermal shock resistance and lensing strength, as shown in FIG. 5. In some embodiments, the nonlinear optical material can be $ZnGeP_2$, $CdGeAs_2$, or $CdSiP_2$. In some embodiments, the nonlinear optical material 105 can include the orientation-patterned III-V materials GaP and GaN as well as ternary III-V compounds such as AlIGaAs, and the II-VI materials ZnSe, ZnTe and CdTe.

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. An apparatus for thermally inducing an optical waveguide in a nonlinear optical system, the apparatus comprising:
   a nonlinear optical material without cladding and having an index of refraction that increases with temperature, the nonlinear optical material having a first dimension and a second dimension in a horizontal plane and a third dimension in a vertical plane, the third dimension being approximately ten times smaller than the first and second dimension;
   at least one heat sink thermally coupled to the nonlinear optical material to establish a one-dimensional thermal gradient across the third dimension of the nonlinear optical material when the nonlinear optical material is heated, the thermal gradient having an approximately parabolic profile across the nonlinear optical material; and
   a laser having a power of greater than one watt, the laser configured to provide a laser beam incident upon the nonlinear optical material to heat the nonlinear optical material and induce a waveguide to be formed in the nonlinear optical material due to said one-dimensional thermal gradient established by said at least one heat sink.

2. The system of claim 1 wherein the nonlinear optical material has a planar geometry.

3. The system of claim 1 wherein the nonlinear optical material is a semiconductor material.

4. The system of claim 1 wherein the index of refraction of the nonlinear optical material changes by a factor of approximately $1 \times 10^4$ for every degree Kelvin change in temperature.

5. The system of claim 1 wherein the nonlinear optical material has a stress fracture limit that permits waveguiding of the laser beam.

6. The system of claim 1 wherein the nonlinear optical material is configured to act as a thermal lens along the third dimension when the laser beam having a power of greater than one watt is incident upon the optical material.

7. The system of claim 1 wherein the nonlinear optical material has a thermal shock resistance and a lensing strength, the product of the shock resistance and the lensing strength being greater than approximately 2000.

8. The system of claim 1 wherein the nonlinear optical material is at least one of ZnGeP2, CdGeAs2, CdSiP2, GaP, GaN, AlTGaAs, ZnSe, ZnTe and CdTe.

9. An apparatus for thermally inducing an optical waveguide in a nonlinear optical system, the apparatus comprising:
   a nonlinear optical material without a cladding and having an index of refraction that increases with an increase in temperature;
   cooling means thermally coupled to the nonlinear optical material to establish a one dimensional thermal gradient across a smallest dimension of the nonlinear optical material when the nonlinear optical material is heated; and
   a laser configured to provide a laser beam incident upon the nonlinear optical material to heat the nonlinear optical material and induce a planar waveguide to be formed in the nonlinear optical material due to said thermal gradient established by said cooling means.

10. The system of claim 9 wherein the nonlinear optical material has a planar geometry.

11. The system of claim 9 wherein the nonlinear optical material is a semiconductor material.

12. The system of claim 9 wherein the index of refraction of the nonlinear optical material changes by a factor of $1 \times 10^{-4}$ for every degree Kelvin change in temperature.

13. The system of claim 9 wherein the nonlinear optical material has a thermal stress fracture limit that permits the formation of a thermally induced optical waveguide resulting from the incident laser beam.

14. The system of claim 9 wherein the nonlinear optical material is configured to act as a thermal lens across the smallest dimension of the optical material when a laser beam having a power of greater than one watt is incident upon the optical material.

15. The system of claim 9 wherein the nonlinear optical material has a thermal shock resistance and a lensing strength, the product of the shock resistance and the lensing strength being greater than approximately 2000.

16. The system of claim 9 wherein the nonlinear optical material is at least one of ZnGeP2, CdGeAs2, CdSiP2, GaP, GaN, AliGaAs, ZnSe, ZnTe and CdTe.

17. In a nonlinear optical system, a method for guiding an optical beam and inducing a waveguide in a nonlinear optical material using a laser beam, the method comprising:
   providing a nonlinear optical material without a cladding and having an index of refraction sensitive to changes in temperature, the nonlinear optical material having a thermal shock resistance and a lensing strength, the product of the shock resistance and the lensing strength being greater than approximately 2000;
   providing a cooling means thermally coupled to the nonlinear optical material to establish a one dimensional thermal gradient across a smallest dimension of the nonlinear optical material;
   delivering a first laser beam having a power of greater than one watt to an entrance facet of the nonlinear optical material heating the nonlinear optical material, the laser beam transforming the nonlinear optical material into a waveguide due to said thermal gradient established by said cooling mean; and
   delivering the first laser beam and additional beams created by nonlinear processes to an exit facet of the nonlinear optical material, wherein the first laser beam and the additional beams are guided to the exit facet by the nonlinear optical material transformed into said waveguide.

18. The method of claim 17 wherein the nonlinear optical material is a semiconductor material or a nonlinear optical material.

19. The method of claim 17 wherein the index of refraction of the nonlinear optical material changes by a factor of approximately 1×104 for every degree Kelvin change in temperature.

20. The method of claim 17 wherein the nonlinear optical material is at least one of ZnGeP2, CdGeAs2, CdSiP2, GaP, GaN, AlIGaAs, ZnSe, ZnTe and CdTe.

21. The system of claim 1 where the formation of the nonlinear optical waveguide is combined with an appropriate optical design to minimize the change in output beam properties caused by generation of heat in a nonlinear material resulting from an incident laser beam.

* * * * *